United States Patent [19]
Braun et al.

[11] Patent Number: 5,040,377
[45] Date of Patent: Aug. 20, 1991

[54] COOLING SYSTEM WITH IMPROVED FAN CONTROL AND METHOD

[75] Inventors: James E. Braun; George T. Diderrich, both of Shorewood, Wis.

[73] Assignee: Johnson Service Company, Milwaukee, Wis.

[21] Appl. No.: 439,852

[22] Filed: Nov. 21, 1989

[51] Int. Cl.$^5$ .......................... F25B 39/04; F28D 5/00
[52] U.S. Cl. ....................................... 62/183; 62/171; 62/305; 165/39; 165/900; 261/DIG. 11
[58] Field of Search ................. 62/171, 181, 182, 183, 62/184, 185, 201, 305, 314, DIG. 17; 261/26, 129, DIG. 11; 165/900, 39; 374/40, 41

[56] References Cited

U.S. PATENT DOCUMENTS

| | | | |
|---|---|---|---|
| 4,252,751 | 2/1981 | Shito | 261/DIG. 11 |
| 4,325,223 | 4/1982 | Cantley | 62/171 X |
| 4,485,449 | 11/1984 | Knauss | 374/41 X |
| 4,554,964 | 11/1985 | Awano et al. | 62/183 X |
| 4,901,918 | 2/1990 | Grald et al. | 236/78 D |

Primary Examiner—Harry B. Tanner
Attorney, Agent, or Firm—Foley & Lardner

[57] ABSTRACT

There is disclosed a new and improved cooling system and method for cooling the air in an enclosed space. The cooling system includes a cooling tower having a plurality of fans arranged to cool a first fluid and a chiller including a condenser thermally coupled to the first fluid, a compressor, and an evaporator. The chiller further includes first conduit means for carrying a refrigerant. A chilled fluid loop including second conduit means circulates a second fluid through the evaporator for cooling the second fluid and is arranged to flow air over the second conduit means and into the enclosed space for cooling the air in the enclosed space. Fan control means controls the speed of the cooling tower fans to minimize the total power consumption of the fan motors and the compressor. The fan control means include load determining means for determining the heat transfer load on the chiller, control factor means for generating a control factor which is proportional to the load on the chiller, and speed control means for increasing or decreasing the speed of one or more of the fans responsive to the control factor.

16 Claims, 3 Drawing Sheets

COOLING SYSTEM WITH IMPROVED FAN CONTROL AND METHOD

BACKGROUND OF THE INVENTION

The present invention generally relates to an improved cooling system and method for cooling the air in an enclosed space. The present invention more particularly relates to such a system which includes an improved fan control and method for controlling the speed and sequencing of a plurality of fans which cool the water used in a condenser water loop so that total power consumption of the system can be minimized.

Cooling systems, such as air conditioning systems, for cooling the air in an enclosed space, such as a building, are well-known in the art. Such systems generally include a condenser water loop having a cooling tower comprising a plurality of fans which provide cooled water to a condenser. Each fan is driven by a fan motor which consumes power. As the air flow provided by the fans is increased due to increased fan speed, an increased amount of heat is transferred from the water to the external air. Increased fan speed also results in increased fan motor power consumption.

Such systems further generally include a chiller which conducts a refrigerant through the condenser and an evaporator under the influence of a pressure differential provided by a compressor. The compressor includes a motor which consumes power and the power consumption of the compressor motor and hence, the chiller power, increases as the pressure differential is required to increase. An increased pressure differential is generally required when the temperature of the condenser water increases. Hence, through proper cooling tower fan control, the overall power consumption of the fan motors and the compressor can be minimized.

Lastly, cooling systems also generally include a chilled water loop. The chilled water loop conducts water through the chiller evaporator wherein heat is exchanged from the water of the chilled water loop to the refrigerant in the evaporator. The chilled water is also conducted through a set of coiled conduits. Air is blown over the coiled conduits to provide cooled air to a set of ducts which then distributes the cooled air throughout the enclosed space to be cooled.

In order to minimize the power consumption of such a cooling system, it is therefore necessary to properly control the speed of the cooling tower fans. One common control strategy is to vary the tower air flow in order to maintain a fixed water supply temperature to the chiller condenser. A better, but non-optimal, control strategy is to maintain a constant temperature difference between the cooling tower outlet and the ambient wet bulb.

By controlling cooling tower fans to set point values relating to variables that change only through time, such as to maintain a fixed approach to an ambient wet bulb temperature, these closed-loop control strategies are inherently unstable. Since cooling tower fans are customarily one- or two-speed fans requiring discrete control, the desired set point cannot be realized, resulting in an oscillating tower fan control.

Open-loop control strategies have also been suggested in the art. One such strategy utilized a control map tailored to a specific system which represented a look-up table for optimal control set points as a function of load and ambient wet bulb temperature. A practical difficulty resides in this approach because implementing this procedure centers on the method for determining the control maps. The optimal control maps were derived through the use of detailed computer simulations. This procedure is cumbersome, requiring considerable expertise, along with many measurements to match the models to the actual system performance.

The present invention overcomes the difficulties associated with the prior art approaches to cooling tower control. The system and method of the present invention utilizes open-loop control of the cooling tower fans and such open-loop control is performed by determining simple estimates of control parameters by utilizing fixed cooling system design information.

SUMMARY OF THE INVENTION

The invention therefore provides a cooling system for cooling the air in an enclosed space. The cooling system includes a condenser fluid loop including a cooling tower having a plurality of fans with each fan including a respective fan motor wherein the cooling tower fans are arranged to cool a first fluid. The cooling system further includes a chiller including a condenser thermally coupled to the first fluid, a compressor, and an evaporator, wherein the chiller includes first conduit means for carrying a refrigerant. The cooling system further includes a chilled fluid loop including second conduit means for circulating a second fluid through the evaporator for cooling the second fluid and is arranged to flow air over the second conduit means and into the enclosed space for cooling the air in the enclosed space, and fan control means for controlling the speed of the cooling tower fans to minimize the total power consumption of the fan motors and the compressor. The fan control means includes load determining means for determining the heat transfer load on the chiller, control factor means for generating a control factor which is proportional to the load on the chiller, and speed control means for increasing or decreasing the speed of one or more of the fan motors responsive to the control factor.

The present invention further provides in a cooling system of the type adapted for cooling the air in an enclosed space and including a condenser fluid loop including a cooling tower having a plurality of fans with each fan including a respective fan motor, wherein the cooling tower fans are arranged to cool a first fluid, a chiller including a condenser thermally coupled to the first fluid, a compressor, and an evaporator, wherein the chiller includes first conduit means for carrying a refrigerant, and a chilled fluid loop including second conduit means for circulating a second fluid through the evaporator for cooling the second fluid and arrange to flow air over the second conduit means and into the enclosed space for cooling the air in the enclosed space, a method for controlling the speed of the cooling tower fans to minimize the total power consumption of the fan motors and the compressor. The method includes the steps of determining the heat transfer load on the chiller, generating a control factor which is proportional to the load on the chiller, and controlling the speed of the fans by increasing or decreasing the speed of one or more of the fan motors responsive to the control factor.

BRIEF DESCRIPTION OF THE DRAWINGS

The features of the present invention which are believed to be novel are set forth with particularity in the appended claims. The invention, together with further advantages thereof, may best be understood by making reference to the following description taken in conjunction with the accompanying drawings in the several figures of which like reference numerals indicate identical elements, and wherein:

DESCRIPTION OF THE PREFERRED EMBODIMENT

Figure 1:
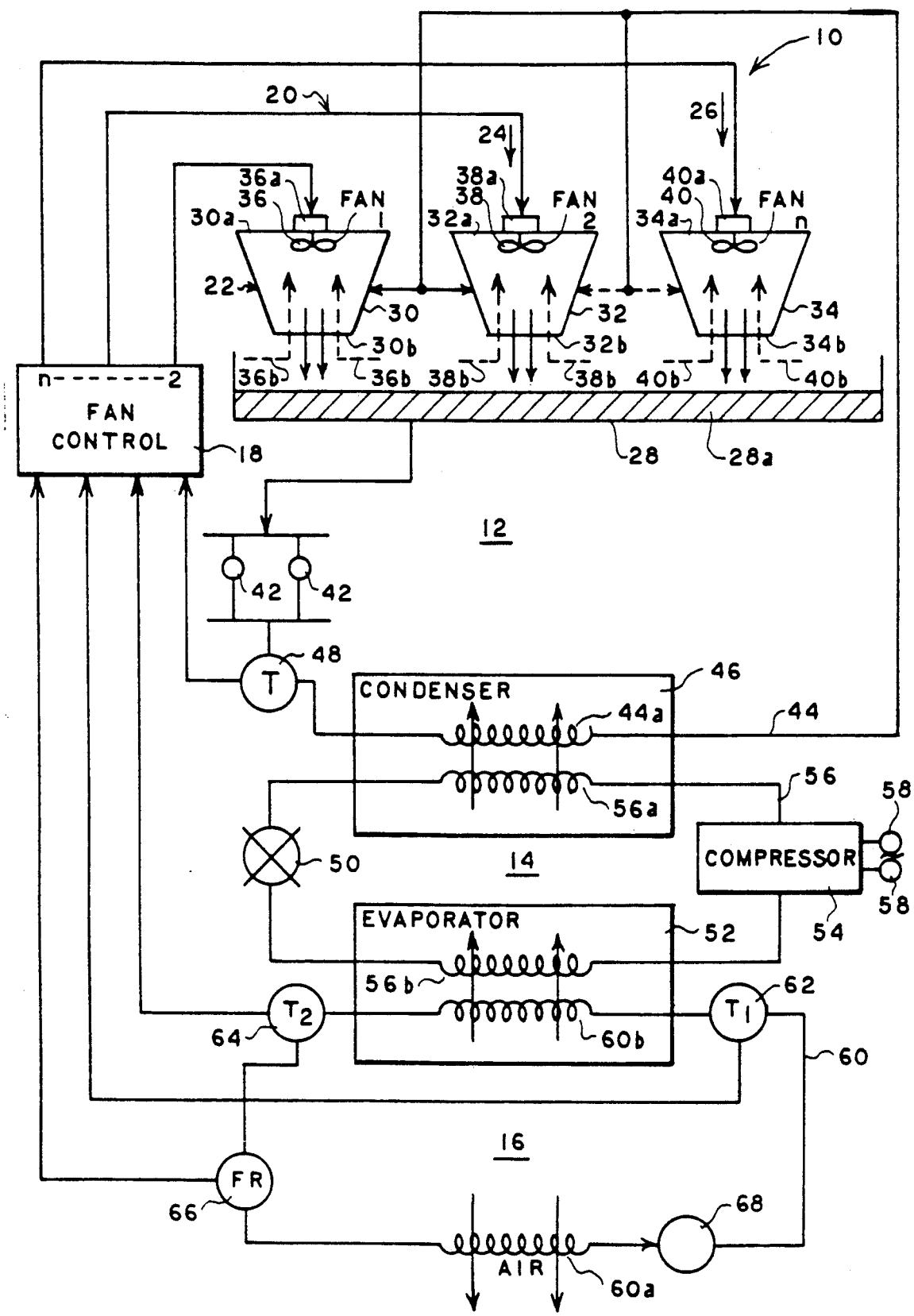
FIG. 1 is a diagrammatic representation of a cooling system embodying the present invention.

Referring now to FIG. 1, it illustrates a cooling system 10 embodying the present invention. The cooling system 10 generally includes a condenser water loop 12, a chiller 14, a chilled water loop 16, and a fan control 18.

The condenser water loop 12 includes a cooling tower 20 comprising a plurality of cells 22, 24, and 26. As indicated in the figure, any number of cells from 1 to n number of cells may be employed in practicing the present invention. The cooling tower also includes a reservoir 28 for holding a first fluid, such as water, to be cooled by the cooling tower 20.

Each of the cells 22, 24, and 26 includes a baffle 30, 32, and 34 respectively. Each baffle includes an opened top 30a, 32a, and 34a and an opened bottom 30b, 32b, and 34b. Suspended within each baffle 30, 32, and 34, is a fan 36, 38, and 40. Each of the fans 36, 38, and 40 is driven by a motor 36a, 38a, and 40a. The fans may be 1-speed fans, 2-speed fans, or variable-speed fans, or multi-speed fans having more than two speeds. The fans are arranged in the baffles so that when the fans are operative, they create an upward air flow as indicated by the dashed lines 36b for creating a heat transfer from the water 28a to the external air for cooling the water 28a.

The reservoir 28 is fluidly coupled to pumps 42 for causing the water to circulate through conduit means 44 of the condenser water loop 12. The pumps 42 cause the water to be pumped through a condenser 46 and back to the reservoir 28. The water enters the reservoir through the baffles 30, 32, and 34.

Also included within the condenser water loop is a temperature sensor 48 which senses the temperature of the cooled water supplied to the condenser 46. The temperature sensor 48 is coupled to the fan control 18 for reasons to be explained hereinafter.

The chiller 14 generally includes the condenser 46, a valve 50, an evaporator 52, and a compressor 54. The chiller 14 also includes first conduit means 56 for circulating a refrigerant contained therein through the condenser 46, the valve 50, the evaporator 52, and the compressor 54. The compressor 54 includes a pair of power terminals 58 adapted to be coupled to a power source for providing power to the compressor 54.

The chilled water loop 16 includes the evaporator 52, and second conduit means 60 for circulating a second fluid, such as water, through the chilled water loop. The chilled water loop further includes a first temperature sensor 62, a second temperature sensor 64, and a flow rate sensor 66. The first temperature sensor 62 senses the temperature of the water entering the evaporator. The second temperature sensor 64 senses the temperature of the water exiting the evaporator and the flow rate sensor 66 senses the flow rate of the water circulating in the chilled water loop. The first temperature sensor 62, the second temperature sensor 64, and the flow rate sensor 66 are all coupled to the fan control 18 so that the load on the chiller 16 may be determined by the fan control 18. The load on the chiller is equal to the temperature difference between the temperature sensed by the first temperature sensor 62 and the temperature sensed by the second temperature sensor 64 multiplied by the flow rate measured by the flow rate sensor 66. As will be seen hereinafter, the speed of the fans 36, 38, and 40, and thus the control tower air flow, is controlled in response to the load on the chiller and more particularly, in accordance with a control factor which is a linear function of the load on the chiller.

The chilled water loop further includes a pump 68 for circulating the water through the chilled water loop and a coiled section 60a of the second conduit 60. The coiled section 60a is arranged so that air may be flowed over the coil section 60a for cooling the air which is flowed over the coiled section 60a. The air which is flowed over the coil section 60a then enters a set of ducts (not shown) which distributes the cooled air throughout an enclosed space to be cooled by the system 10.

In the operation of cooling systems of this type, the cooled water of the condenser loop flows through a coiled portion 44a of the conduit 44. The coiled portion 44a is in close proximity to a coiled portion 56a of the first conduit 56 within the condenser so as to thermally couple the condenser water loop to the chiller. The cool water entering the condenser causes the refrigerant carried in the first conduit 56 to condense and thereby create a heat transfer from the refrigerant to the cooled water as illustrated. A second coiled portion 56b of the first conduit 56 within the evaporator 52 thermally couples the chiller 14 to the chilled water loop which includes a coiled portion 60b in the evaporator 52. As a result, there is a thermal transfer as indicated in the evaporator 52 from the water in the chilled water loop 16 to the refrigerant in the chiller 14 which evaporates the refrigerant so that the water within the chilled water loop is chilled.

To provide the condensation and evaporation of the refrigerant, the compressor must maintain a sufficient pressure differential between the evaporator and the condenser. The differential pressure required decreases if the temperature of the water flowing into the condenser decreases, if the temperature of the refrigerant decreases, or if the temperature of the refrigerant exiting the evaporator increases. Obviously, if the pressure differential is required to increase, this requires increased power consumption on the part of the compressor 54.

The temperature of the cooled water in the condenser water loop greatly affects the temperature of the refrigerant in the chiller and thus it also has a significant effect upon the amount of power required by the compressor. The temperature of the cooled water in the condenser water loop is in turn greatly affected by the air flow in the cells 22, 24, and 26 of the cooling tower 20. The fan control 18 controls the speed and sequencing of the fans 36, 38, and 40 in response to the load on the chiller to thereby minimize the power consumption required of the cooling tower fans and the chiller compressor.

From the foregoing, it can be seen that the optimal cooling tower control results from a trade-off in the power consumption of the chiller and the cooling tower fans. The power consumption of the chiller is sensitive to the condenser water temperature, which is in turn affected by the cooling tower control. Increasing the tower air flow reduces the chiller power requirement, but at the expense of an increase in fan power consumption. For a given set of conditions, an optimal tower control exists that minimizes the sum of the chiller and cooling tower fan power. The determination of the optimal tower fan control may be separated into two parts: tower sequencing; and optimal air flow. For a given total tower air flow, optimal tower sequencing specifies the number of operating cells and the fan speeds that give the minimum power consumption. Once the tower sequencing is specified, the optimal air flow can then be determined by taking into account the trade-offs between the chiller power and the fan power. In accordance with the present invention, near-optimal control of the cooling tower fans is provided by determining a control factor which may be determined from the chiller load and cooling system design parameters. Hence, in practicing the present invention, there is no need for unstable closed-loop control nor an open-loop control which is difficult to implement.

To determine a sequencing schedule for the fans of the various cells of the cooling tower, the tower air flow varies almost linearly with fan speed, while the fan power consumption varies approximately with the cube of the speed. Thus, if the cooling tower fans are variable-speed fans, the minimum power consumption results from operating all cooling tower cells under all conditions.

If the fans are multiple-speed fans rather than continuously adjustable variable-speed fans, it is not optimal to operate all fans under all conditions. Generally, when additional air flow is required, the speed of the tower fan operating at the lowest speed (including fans that are off) should be increased first. Similarly, for decreasing cooling tower air flow, the speeds of the fans operating at the highest speeds should be reduced first.

The foregoing guidelines are derived from evaluating the incremental power changes associated with fan sequencing. For two-speed fans, the incremental power increase associated with adding a low-speed fan is less than that for increasing one to high speed if the low speed is less than 79% of the high fan speed. In addition, if the low speed is greater than 50% of the high speed, then the incremental increase in air flow is greater for better thermal performance by adding the low-speed fan. Most commonly, the low speed of a two-speed cooling tower fan is between one-half and three-quarters of full speed. In this case, cooling tower fans should be brought on-line at low speed before any fans are set to high speed. Similarly, the fan speeds should be reduced to low speed before any fans are brought off-line.

For three-speed fans, where low speed is greater than or equal to one-third of full speed and the difference between the high and intermediate speeds is equal to the difference between the intermediate and low speeds, then the best schedule is to increment the lowest fan speeds first when adding additional air flow and decrement the highest fan speeds when reducing air flow. Typical three-speed combinations that satisfy this criteria are (1) one-third, two-thirds, and full speed or (2) one-half, three-quarters, and full speed.

Hence, from the foregoing, proper sequencing can be summarized as follows. If all of the fans are variable-speed fans, then all of the fans should be operated at equal speeds. If all of the fans are multi-speed fans, the speed of the lowest speed fans should be increased first when adding additional air flow, and the speed of the highest speed fans should be reduced first when the air flow is to be reduced. Lastly, if the fans comprise a combination of variable-speed fans and multi-speed fans, all of the variable-speed fans should be operated at equal speeds. The speed of the lowest speed fans should be increased first when increasing air flow with multi-speed fans. The air flow provided by the multi-speed fans should be increased when the speeds of the variable-speed fans match the fan speed associated with the next multi-speed fan increment to be added.

In accordance with the present invention, the cooling tower fans may be sequenced responsive to a control factor ($G_{twr}$) which is a relative tower air flow factor. When the chiller load is above 25% of its full load capacity, the control factor may be determined from Equation 1 below:

$$G_{twr} = 1 - \beta_{twr}(PLR_{twr,cap} - PLR) \qquad \text{Equation 1}$$

wherein:
$G_{twr}$ is the optimal tower air flow divided by the maximum power air flow if all fans were operating at high speed;
PLR is the chilled water load divided by the total chiller cooling capacity (part-load ratio);
$PLR_{twr,cap}$ is the part-load ratio (value of PLR) at which the cooling tower operates at its capacity ($G_{twr} = 1$); and
$\beta_{twr}$ is the slope of the relative tower air flow ($G_{twr}$) versus part-load ratio (PLR) function.

This defines a linear relationship between air flow and the chiller load. The above relationship is utilized when the chiller load is greater than 25% of its load capacity. In the case of many cooling systems, "free cooling" options are utilized at smaller loads so that the chillers do not operate. However, for those systems wherein chiller operation is necessary below 25% of full load, the total air flow should then be ramped to zero as the load goes to zero. For these situations, the control factor, wherein the part-load ratio is less than 25%, may be determined by Equation 2 below:

$$G_{twr} = 4PLR[1 - \beta_{twr}(PLR_{twr,cap} - 0.25)] \qquad \text{Equation 2}$$

wherein:
$G_{twr}$ is the optimal tower air flow divided by the maximum power air flow if all fans were operating at high speed;
PLR is the chilled water load divided by the total chiller cooling capacity (part-load ratio);
$PLR_{twr,cap}$ is the part-load ratio (value of PLR) at which the cooling tower operates at its capacity ($G_{twr} = 1$); and
$\beta_{twr}$ is the slope of the relative tower air flow ($G_{twr}$) versus part-load ratio (PLR) function.

The control factor ($G_{twr}$) determined by Equation 1 or Equation 2 must be constrained between 0 and 1. The control factor, which is the fraction of tower capacity, is then converted to a tower control for controlling the speed and sequencing of the cooling tower fans utilizing the sequencing schedule previously described.

The constants $PLR_{twr,cap}$ and $\beta_{twr}$ utilized in the linear open-loop control factor Equations 1 and 2 may be determined by taking detailed measurements in a cooling system over a range of conditions and using a model to determine accurate estimates of these constants for a given system. However, this procedure requires measurements of component power consumptions along with considerable time and expertise and may not be cost-effective, unless performed by on-the-job plant personnel.

Alternatively, and preferably, good estimates of these parameters may be determined analytically using design parameters of the cooling system. These design parameters or factors are: (1) the ratio of chiller power to cooling tower fan power at design conditions ($P_{ch,des} \div P_{twr,des}$); (2) the sensitivity of chiller power to changes in condenser water temperature (S); and (3) the sum of the tower approach and range at design conditions ($a_{twr,des} + r_{twr,des}$).

The constants $PLR_{twr,cap}$ and $\beta_{twr}$ utilized in Equations 1 and 2 depend upon the type of fans utilized in the cooling tower. For single-speed fans:

$$PLR_{twr,cap} = \frac{1}{\sqrt{\frac{P_{ch,des}}{P_{twr,des}} S(a_{twr,des} + r_{twr,des})}}$$

and $$\beta_{twr} = \frac{1}{PLR_{twr,cap}}.$$

When each of the fans of the cooling tower is a two-speed fan:

$$PLR_{twr,cap} = \frac{1}{\sqrt{\frac{1}{2}\frac{P_{ch,des}}{P_{twr,des}} S(a_{twr,des} + r_{twr,des})}}$$

and $$\beta_{twr} = \frac{2}{3 PLR_{twr,cap}}.$$

When each of the fans in the cooling tower is a fan having more than two speeds:

$$PLR_{twr,cap} = \frac{1}{\sqrt{\frac{1}{3}\frac{P_{ch,des}}{P_{twr,des}} S(a_{twr,des} + r_{twr,des})}}$$

and $$\beta_{twr} = \frac{.5}{PLR_{twr,cap}}.$$

The chiller power consumption at design conditions is the total power consumption of all plant chillers operating at their design cooling capacity. Likewise, the design tower fan power is the total power associated with all tower cells operating at high speed. As the ratio of chiller power to tower fan power increases, then it becomes more beneficial to operate the tower at higher air flows. This would be reflected in a decrease in the part-load ratio at which the tower reaches its capacity, $PLR_{twr,cap}$. If the tower air flow were free (i.e., zero fan power) then $PLR_{twr,cap}$ goes to zero, and the best control strategy would be to operate the towers at full capacity independent of the load. A typical value for the ratio of the chiller power to the cooling tower fan power at design conditions is 10.

The chiller sensitivity factor, S, is the incremental increase in chiller power for each degree increase in condenser water temperature as a fraction of the power. In other words, S is equal to the change in chiller power divided by the change in condenser water temperature times the chiller power. If the chiller power increases by 2% for a 1° increase in condenser water temperature, then S is equal to 0.02. A large sensitivity factor indicates that the chiller power is very sensitive to the cooling tower control which would favor operating the cooling tower at higher air flows (low $PLR_{twr,cap}$). The sensitivity factor should be evaluated at design conditions using chiller performance data. Typically, the sensitivity factor is between 0.1 and 0.3.

The design approach to wet bulb ($a_{twr,des}$) is the temperature difference between the tower reservoir water and the ambient wet bulb for the tower operating at its air and water flow capacity at the system designed conditions. The design range ($r_{twr,des}$) is the water temperature difference across the cooling tower at the same conditions. The sum of $a_{twr,des}$ and $r_{twr,des}$ is the temperature difference between the tower inlet and the wet bulb and represents a measure of the cooling tower capability to reject heat to ambient conditions relative to the system requirements. A small temperature difference results from a high tower heat transfer effectiveness and high water flow rate and yields lower condenser water temperatures with lower chiller power consumption. Typical values for the design approach and range are 7° F. and 10° F.

The part-load ratio associated with the tower operating at full capacity may be greater than or less than one. Values less than unity imply that from an energy point of view, the tower is not sized for optimal operation at design load conditions and that the tower should operate at its capacity for a range of loads less than the design load. Values greater than one imply that the cooling tower is oversized for the design load and that the tower should never operate at its full capacity.

The control factor as determined by Equations 1 or 2 must be bounded between 0 and 1 due to possible physical constraints of the system. There are additional constraints on the temperature of the supply water to the chiller condensers that are necessary to avoid potential safety problems. Some chillers may have a low limit on the condenser water supply temperature that is necessary to avoid lubrication migration from the compressor. The high temperature limit is also necessary to avoid excessively high pressures within the condenser that can lead to compressor surge. If the condenser water temperature falls below the low limit, then it is necessary to override the control factor and reduce the tower air flow to go above this limit. Similarly, if the high limit is exceeded, then the cooling tower air flow should be increased as required. For this reason, shown in FIG. 1, a temperature sensor 48 is coupled in between the pump 42 and the condenser 46 so that the temperature of the condenser water may be determined.

Figure 2:
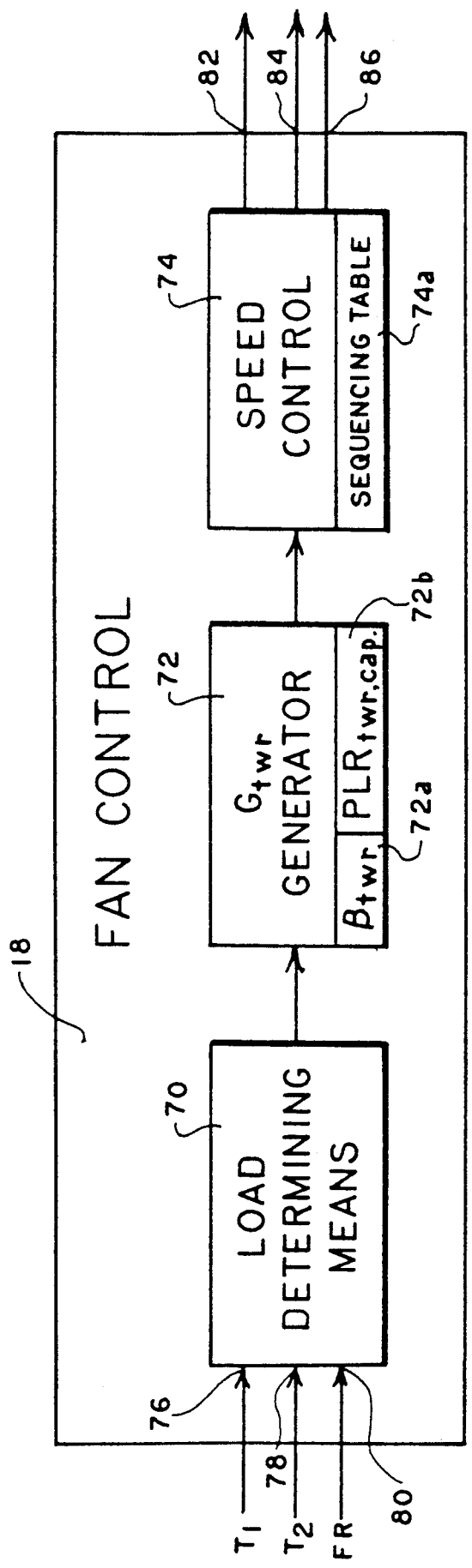
FIG. 2 is a block diagram of the fan control of FIG. 1 embodying the present invention.

Referring now to FIG. 2, it shows a block diagram of a fan control which may be utilized as the fan control 18 of FIG. 1 in practicing the present invention. The fan control 18 includes a load determining means 70, a control factor generator 72, and a speed control 74. The load determining means receives at an input 76 from the first temperature sensor 62 the temperature of the water entering the evaporator 52. At another input 78, the load determining means receives the temperature sensed by the second temperature sensor 64 which is the temperature of the water exiting the evaporator. At another input 80, the load determining means receives the flow rate measured by the flow rate sensor 66. From these parameters, the load determining means can determine the chiller load. The load determining means is coupled to the control factor generating means 72 and provides the control factor generating means with the chiller load. From the chiller load, and stored values for $\beta_{twr}$ and $PLR_{twr,cap}$ stored in registers 72a and 72b, the control factor generator 72 can generate the control factor $G_{twr}$ and bound the same between 0 and 1 as previously described.

The speed control 74 is coupled to the control factor generator 72 and receives the value of the control factor therefrom. The speed control may include a storage 74a which has therein a sequencing table which defines the fan speed sequencing relative to various values of the control factor. Responsive to the value of the control factor, the speed control will issue control signals at its outputs 82, 84, and 86 which are coupled to respective fan motors for either increasing or decreasing the speeds of the fans responsive to the value of the control factor.

Figure 3:
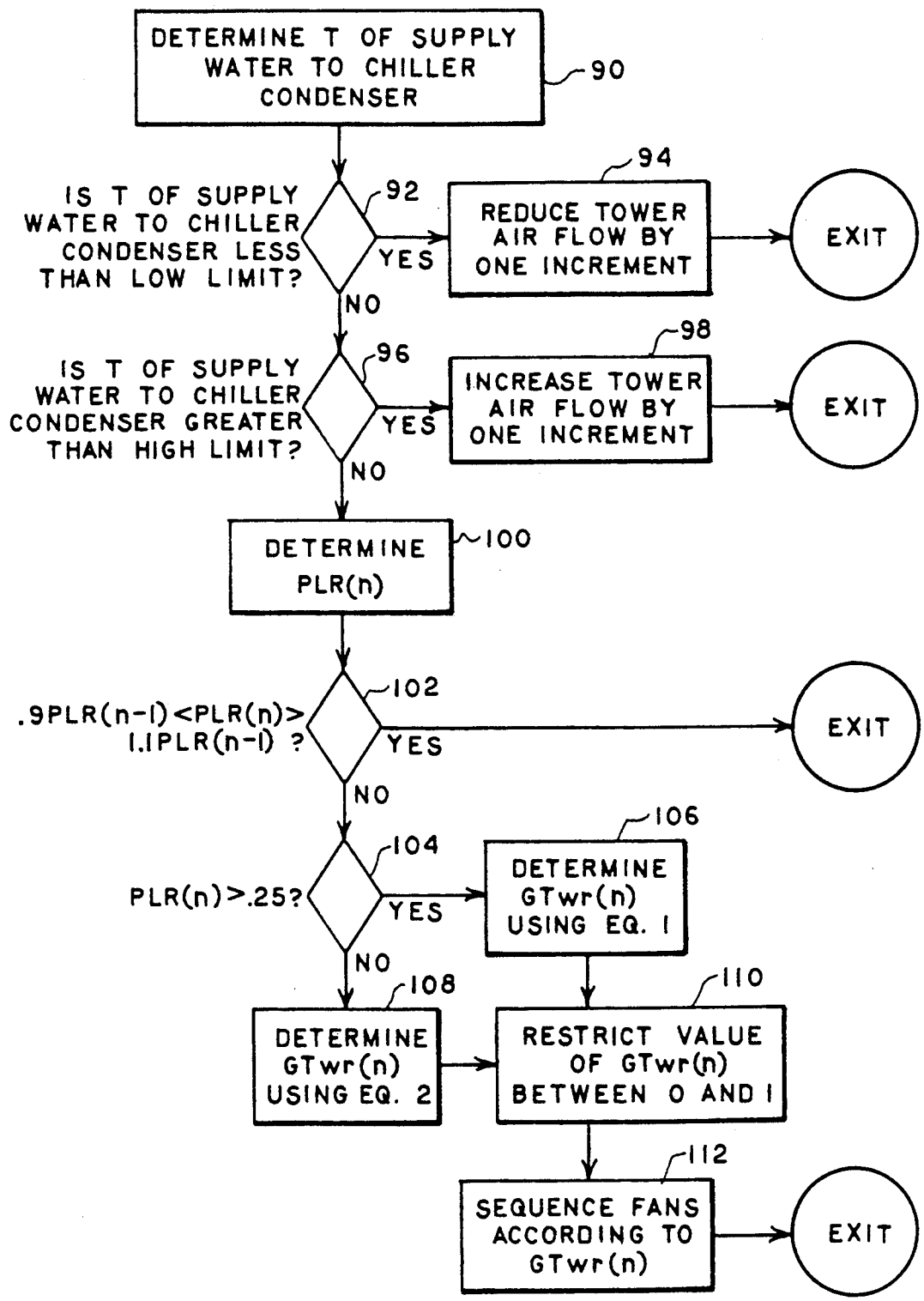
FIG. 3 is flow diagram illustrating the manner in which the fan control of FIG. 1 may be implemented in practicing the present invention in accordance with the preferred embodiment.

Referring now to FIG. 3, FIG. 3 is a flow chart illustrating the manner in which the fan control may be implemented in accordance with the present invention. In a practical system, the fan control may execute the flow diagram sequence at periodic intervals, such as, once every 15 minutes.

In step 90, the fan control first determines the temperature of the supply water to the chiller condenser as sensed by the temperature sensor 48. Next, in step 92, the fan control determines if the temperature of the supply water to the chiller condenser is less than the low limit. If it is, the fan control will then in step 94 reduce the tower air flow by one increment and then exit. If the temperature of the supply water to the chiller condenser is not less than the lower limit, the fan control will then determine in step 96 if the temperature of the supply water to the chiller condenser is greater than the high limit. If it is, the fan control will increase the tower air flow by one increment in step 98 and then exit.

If the temperature of the supply water to the chiller condenser was not greater than the high limit, the fan control will then determine the value of the chiller load part ratio for this time interval in step 100. Next, in step 102, the fan control will determine if the chiller part-load ratio has changed by more or less than ten percent since the last control change. If it has not, the fan control will exit. However, if the chiller part-load ratio has increased or decreased by more than ten percent, the fan control will then in step 104 determine if the chiller part-load ratio is greater than 0.25. If it is, the fan control will then in step 106 determine the value of the control factor using Equation 1. If it is not, it will then determine in step 108 the value of the control factor using Equation 2. After the control factor has been determined, the fan control will then in step 110 restrict the value of the control factor between 0 and 1. Lastly, in step 112, responsive to the value of the control factor, the fan control will sequence the fans according to the control factor and then exit.

In order to sequence and control the speeds of the fans responsive to the value of the control factor, the sequencing table 74a of FIG. 2 must first be created. In doing so, the control factor or relative tower air flow must be converted to a specific set of tower fan settings using the sequencing rules previously described. This involves defining a relationship for fan settings as a function of relative tower air flow or control factor. The table is preferably constructed by defining the best fan settings for each possible increment of the control factor. The control process, between the continuous output of Equation 1 or 2 and the discrete fan control, involves choosing the set of discrete settings from the table that produces the tower air flow closest to the desired flow. However, in general, it is preferred to have greater air flow than the optimal air flow rather than less air flow than the optimal air flow. Preferably, a set of discrete fan controls should be selected which results in a relative air flow that is closest to, but not more than 10% less than the results obtained using Equation 1 or 2.

EXAMPLE

Consider an example plant consisting of four 550 ton chillers with four cooling tower cells, each having two-speed fans. Each chiller consumes approximately 400 kW at the design capacity, while each tower fan utilizes 40 kW at high speed. At design conditions, the chiller power increases approximately 10 kW for a 1° F. increase in condenser water temperature, giving a sensitivity factor of 10/400 or 0.02 kW/F. The tower design approach and range from system design data are 7° F. and 10° F.

The first step is the determination of the constants of Equation 1 from the design data. The part-load ratio at which operation of the tower is at its capacity is estimated for the two-speed fans as:

$$PLR_{twr,des} = \frac{1}{\sqrt{\frac{1}{2}(0.02 \text{ kW/F}) \frac{(4 \times 400 \text{ kW})}{(4 \times 40 \text{ kW})} (7° \text{ F.} + 10° \text{ F.})}} = 0.77$$

The slope of the fractional air flow versus part-load ratio is estimated to be $$\beta_{twr} = \frac{0.2}{3 \times 0.77} = 0.87$$

Given these parameters and the part-load ratio, the control factor (fractional tower air flow) is estimated using Equation 1 or 2 depending on whether PLR is less than or greater than 0.25. The result of Equation 1 or 2 provides the value of $G_{twr}$ which then may be used to increase or decrease the fan speeds according to the sequencing table below.

| EXAMPLE COOLING TOWER FAN SEQUENCING | | | | | |
|---|---|---|---|---|---|
| Sequence | | Tower Fan Speeds | | | |
| Number | $G_{twr}$ | Cell #1 | Cell #2 | Cell #3 | Cell #4 |
| 1 | 0.125 | Low | Off | Off | Off |
| 2 | 0.250 | Low | Low | Off | Off |
| 3 | 0.375 | Low | Low | Low | Off |
| 4 | 0.500 | Low | Low | Low | Low |
| 5 | 0.625 | High | Low | Low | Low |
| 6 | 0.750 | High | High | Low | Low |
| 7 | 0.875 | High | High | High | Low |
| 8 | 1.000 | High | High | High | High |

For a specific chilled water load, the fan control should be the sequence of tower fan settings from the table that results in a value of $G_{twr}$ that is closest to, but not more than 10% less than the output of Equations 1 or 2.

From the foregoing, it can be seen that the present invention provides a new and improved control system and method for providing near-optimal control of cooling towers and chilled water systems. The system and method of the present invention have shown to provide control which results in power consumption generally within 1% of the minimum energy consumption for the chillers and cooling tower fans. The system and method of the present invention is based upon an open-loop function of the chilled water load, where parameters are estimated with simple relationships in terms of chiller and cooling tower design characteristics. In addition to reducing operating costs, the present invention also simplifies the control and improves the stability of the tower control as compared with the use of a constant condenser water supply or approach to wet bulb. Hence, the present invention provides a control system and method which is reliable and stable.

We claim:

1. A cooling system for cooling the air in an enclosed space, said cooling system comprising:
   a condenser fluid loop including a cooling tower including a plurality of fans with each said fan including a respective fan motor, said cooling tower fans being arranged to cool a first fluid;
   a chiller including a condenser thermally coupled to said first fluid, a compressor, and an evaporator, said chiller including first conduit means for carrying a refrigerant;
   a chilled fluid loop including second conduit means for circulating a second fluid through said evaporator for cooling said second fluid and being arranged to flow air over said second conduit means and into said enclosed space for cooling the air in said enclosed space; and
   fan control means for controlling the speed of said cooling tower fans to minimize the total power consumption of said fan motors and said compressor, said fan control means including load determining means for determining the heat transfer load on said chiller, control factor means for generating a control factor which is proportional to said load on said chiller, and speed control means for increasing or decreasing the speed of one or more of said fan motors responsive to said control factor, wherein said control factor ($G_{twr}$) is the optimal total air flow to be provided by said fans divided by the maximum possible air flow with all said fans operating at maximum speed, and
   wherein ($G_{twr}$) is equal to:

$$1 - \beta_{twr}(PLR_{twr,cap} - PLR)$$

wherein:
PLR is the chiller load divided by the total chiller cooling capacity (part-load ratio);
$PLR_{twr,cap}$ is the part-load ratio at which said cooling tower operates at maximum capacity;
$\beta_{twr}$ is the slope of the relative tower air flow versus the part-load ratio; and
PLR > 0.25.

2. A system as defined in claim 1 wherein said fans each include single-speed fan motors and wherein:

$$PLR_{twr,cap} = \frac{1}{\sqrt{\frac{P_{ch,des}}{P_{twr,des}} S(a_{twr,des} + r_{twr,des})}}$$

and $$\beta_{twr} = \frac{1}{PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

3. A system as defined in claim 1 wherein said fans each include a two-speed fan motor and wherein:

$$PLR_{twr,cap} = \frac{1}{\sqrt{\frac{1}{2}\frac{P_{ch,des}}{P_{twr,des}} S(a_{twr,des} + r_{twr,des})}}$$

and $$\beta_{twr} = \frac{2}{3 PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

4. A system as defined in claim 1 wherein said fans each include a fan motor having more than two speeds, and wherein:

$$PLR_{twr,cap} = \frac{1}{\sqrt{\frac{1}{3}\frac{P_{ch,des}}{P_{twr,des}} S(a_{twr,des} + r_{twr,des})}}$$

and $$\beta_{twr} = \frac{.5}{PLR_{twr,cap}}$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

5. A cooling system for cooling the air in an enclosed space, said cooling system comprising:
   a condenser fluid loop including a cooling tower including a plurality of fans with each said fan including a respective fan motor, said cooling tower fans being arranged to cool a first fluid;
   a chiller including a condenser thermally coupled to said first fluid, a compressor, and an evaporator, said chiller including first conduit means for carrying a refrigerant;
   a chilled fluid loop including second conduit means for circulating a second fluid through said evaporator for cooling said second fluid and being arranged to flow air over said second conduit means and into said enclosed space for cooling the air in said enclosed space; and fan control means for controlling the speed of said cooling tower fans to minimize the total power consumption of said fan motors and said compressor, said fan control means including load determining means for determining the heat transfer load on said chiller, control factor means for generating a control factor which is proportional to said load on said chiller, and speed control means for increasing or decreasing the speed of one or more of said fan motors responsive to said control factor.

wherein said control factor ($G_{twr}$) is the optimal total air flow to be provided by said fans divided by the maximum possible air flow with all said fans operating at maximum speed, and wherein $G_{twr}$ is equal to:

$$4PLR[1-\beta_{twr}(PLR_{twr,cap}-0.25)]$$

wherein

PLR is the chiller load divided by the total chiller cooling capacity (part-load ratio);

$PLR_{twr,cap}$ is the part-load ration at which said cooling tower operates at maximum capacity;

$\beta_{twr}$ is the slope of the relative tower air flow versus the part-load ration; and

PLR<0.25.

6. A system as defined in claim 5 wherein said fans each include single-speed fan motors and wherein:

$$PLR_{twr,cap} = \frac{1}{\sqrt{\frac{P_{ch,des}}{P_{twr,des}} S(a_{twr,des} + r_{twr,des})}}$$

and $$\beta_{twr} = \frac{1}{PLR_{twr,cap}};$$

wherein:

$P_{ch,des} \div P_{twr,des}$ is the ratio of chiller power to cooling tower fan power;

S is the sensitivity of the chiller power to changes in condenser fluid temperature; and $a_{twr,des} + r_{twr,des}$ is the sum of the tower approach and range.

7. A system as defined in claim 5 wherein said fans each include a two-speed fan motor and wherein:

$$PLR_{twr,cap} = \frac{1}{\sqrt{\frac{1}{2}\frac{P_{ch,des}}{P_{twr,des}} S(a_{twr,des} + r_{twr,des})}}$$

and $$\beta_{twr} = \frac{2}{3PLR_{twr,cap}};$$

wherein:

$P_{ch,des} \div P_{twr,des}$ is the ratio of chiller power to cooling tower fan power;

S is the sensitivity of the chiller power to changes in condenser fluid temperature; and $a_{twr,des} + r_{twr,des}$ is the sum of the tower approach and range.

8. A system as defined in claim 5 wherein said fans each include a fan motor having more than two speeds, and wherein:

$$PLR_{twr,cap} = \frac{1}{\sqrt{\frac{1}{3}\frac{P_{ch,des}}{P_{twr,des}} S(a_{twr,des} + r_{twr,des})}}$$

and $$\beta_{twr} = \frac{.5}{PLR_{twr,cap}}$$

wherein:

$P_{ch,des} \div P_{twr,des}$ is the ratio of chiller power to cooling tower fan power;

S is the sensitivity of the chiller power to changes in condenser fluid temperature; and $a_{twr,des} + r_{twr,des}$ is the sum of the tower approach and range.

9. In a cooling system of the type adapted for cooling the air in an enclosed space and including a condenser fluid loop including a cooling tower including a plurality of fans with each fan including a respective fan motor, the cooling tower fans being arranged to cool a first fluid, a chiller including a condenser thermally coupled to the first fluid, a compressor, and an evaporator, the chiller including first conduit means for carrying a refrigerant, and a chilled fluid loop including second conduit means for circulating a second fluid through the evaporator for cooling the second fluid and being arranged to flow air over the conduit means and into the enclosed space for cooling the air in the enclosed space, a method for controlling the speed of the cooling tower fans to minimize the total power consumption of the fan motors and the compressor, said method including the steps of:

determining the heat transfer load on said chiller;

generating a control factor which is proportional to said load on said chiller; and controlling the speed of said fans by increasing or decreasing the speed of one or more of said fan motors responsive to said control factor, wherein said control facto ($G_{twr}$) is the optimal total air flow to be provided by said fans divided by the maximum possible air flow with all said fans operating at maximum speed, and wherein $G_{twr}$ is equal to:

$$1-\beta_{twr}(PLR_{twr,cap}-PLR)$$

wherein:

PLR is the chiller load divided by the total chiller cooling capacity (part-load ratio);

$PLR_{twr,cap}$ is the part-load ratio at which said cooling tower operates at maximum capacity;

$\beta_{twr}$ is the slope of the relative tower air flow versus the part-load ratio; and

PLR>0.25.

10. A method as defined in claim 9 wherein said fans each include single-speed fan motors and wherein:

$$PLR_{twr,cap} = \frac{1}{\sqrt{\frac{P_{ch,des}}{P_{twr,des}} S(a_{twr,des} + r_{twr,des})}}$$

and

-continued
$$\beta_{twr} = \frac{1}{PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

11. A method as defined in claim 9 wherein said fans each include a two-speed fan motor and wherein:

$$PLR_{twr,cap} = \frac{1}{\sqrt{\frac{1}{2}\frac{P_{ch,des}}{P_{twr,des}} S(a_{twr,des} + r_{twr,des})}}$$

and $$\beta_{twr} = \frac{2}{3PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

12. A method as defined in claim 9 wherein said fans each include a fan motor having more than two speeds, and wherein:

$$PLR_{twr,cap} = \frac{1}{\sqrt{\frac{1}{3}\frac{P_{ch,des}}{P_{twr,des}} S(a_{twr,des} + r_{twr,des})}}$$

and $$\beta_{twr} = \frac{.5}{PLR_{twr,cap}}$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

13. In a cooling system of the type adapted for cooling the air in an enclosed space and including a condenser fluid loop including a cooling tower including a plurality of fans with each fan including a respective fan motor, the cooling tower fans being arranged to cool a first fluid, a chiller including a condenser thermally coupled to the first fluid, a compressor, and an evaporator, the chiller including first conduit means for carrying a refrigerant, and a chilled fluid loop including second conduit means for circulating a second fluid through the evaporator for cooling the second fluid and being arranged to flow air over the conduit means and into the enclosed space for cooling the air in the enclosed space, a method for controlling the speed of the cooling tower fans to minimize the total power consumption of the fan motors and the compressor, said method including the steps of:
determining the heat transfer load on said chiller;
generating a control factor which is proportional to said load on said chiller; and
controlling the speed of said fans by increasing or decreasing the speed of one or more of said fan motors responsive to said control factor,
wherein said control facto ($G_{twr}$) is the optimal total air flow to be provided by said fans divided by the maximum possible air flow with all said fans operating at maximum speed, and
wherein $G_{twr}$ is equal to:

$$4PLR[1 - \beta_{twr}(PLR_{twr,cap} - 0.25)]$$

wherein:
PLR is the chiller load divided by the total chiller cooling capacity (part-load ratio);
$PLR_{twr,cap}$ is the part-load ratio at which said cooling tower operates at maximum capacity;
$\beta_{twr}$ is the slope of the relative tower air flow versus the part-load ration; and
PLR < 0.25.

14. A method as defined in claim 13 wherein said fans each include single-speed fan motors and wherein:

$$PLR_{twr,cap} = \frac{1}{\sqrt{\frac{P_{ch,des}}{P_{twr,des}} S(a_{twr,des} + r_{twr,des})}}$$

and $$\beta_{twr} = \frac{1}{PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

15. A method as defined in claim 13 wherein said fans each include a two-speed fan motor and wherein:

$$PLR_{twr,cap} = \frac{1}{\sqrt{\frac{1}{2}\frac{P_{ch,des}}{P_{twr,des}} S(a_{twr,des} + r_{twr,des})}}$$

and $$\beta_{twr} = \frac{2}{3PLR_{twr,cap}};$$

wherein:
$P_{ch,des} \div P_{twr,des}$ is the ratio of chiller power to cooling tower fan power;
S is the sensitivity of the chiller power to changes in condenser fluid temperature; and
$a_{twr,des} + r_{twr,des}$ is the sum of the tower approach and range.

16. A method as defined in claim 13 wherein said fans each include a fan motor having more than two speeds, and wherein:

$$PLR_{twr,cap} = \frac{1}{\sqrt{\frac{1}{3}\frac{P_{ch,des}}{P_{twr,des}} S(a_{twr,des} + r_{twr,des})}}$$

and

-continued $$\beta_{twr} = \frac{.5}{PLR_{twr,cap}}$$

wherein:

$P_{ch,des} \div P_{twr,des}$ is the ratio of chiller power to cooling tower fan power;

S is the sensitivity of the chiller power to changes in condenser fluid temperature; and $a_{twr,des} + r_{twr,des}$ is the sum of the tower approach and range.

* * * * *